United States Patent [19]

Barry et al.

[11] Patent Number: 4,839,722

[45] Date of Patent: Jun. 13, 1989

[54] METHOD AND APPARATUS FOR PROVIDING IMPROVED COLOR CORRECTION IN A SUBTRATIVE COLOR PRINTING SYSTEM

[75] Inventors: Michael W. Barry, Duluth; E. Neal Tompkins, Atlanta; Peter Zuber, Norcross, all of Ga.

[73] Assignee: Colorocs Corporation, Norcross, Ga.

[21] Appl. No.: 115,440

[22] Filed: Oct. 30, 1987

[51] Int. Cl.$^4$ ............................ G03F 3/08; H04N 1/46
[52] U.S. Cl. ........................................... 358/80; 358/75
[58] Field of Search ............................. 358/80, 75, 78

[56] References Cited

U.S. PATENT DOCUMENTS

| | | | |
|---|---|---|---|
| 3,612,753 | 10/1971 | Korman | 358/80 |
| 4,037,249 | 7/1977 | Pugsley | 358/80 X |
| 4,075,662 | 2/1978 | Gall | 358/78 X |
| 4,270,141 | 5/1981 | Sakamoto | 358/80 |
| 4,335,398 | 6/1982 | Yamada | 358/80 |
| 4,346,402 | 8/1982 | Pugsley | 358/80 |
| 4,402,007 | 8/1983 | Yamada | 358/80 X |
| 4,477,833 | 10/1984 | Clark et al. | 358/80 |
| 4,481,532 | 11/1984 | Clark et al. | 358/80 |
| 4,558,356 | 12/1985 | Toda et al. | 358/80 X |
| 4,561,016 | 12/1985 | Jung et al. | 358/80 X |
| 4,580,889 | 4/1986 | Hiranuma et al. | 358/75 X |
| 4,626,903 | 12/1986 | Giesche et al. | 358/75 X |
| 4,717,954 | 1/1988 | Fujita et al. | 358/80 |
| 4,752,822 | 6/1988 | Kawamura | 358/80 |

FOREIGN PATENT DOCUMENTS

| | | | |
|---|---|---|---|
| 0144188 | 6/1985 | European Pat. Off. | 358/80 |
| 2301393 | 1/1973 | Fed. Rep. of Germany | 358/80 |
| 57-054473 | 3/1982 | Japan | 358/75 |
| 59-072869 | 4/1984 | Japan | 358/80 |
| 60-220659 | 11/1985 | Japan | 358/80 |
| 0652578 | 3/1979 | U.S.S.R. | 358/75 |

OTHER PUBLICATIONS

"A Color Correction Scheme for Color Electronic Printers", by Gary K. Starkweather, from Color Research and Application, vol. II, John Wiley & Sons.

Primary Examiner—James J. Groody
Assistant Examiner—E. Anne Favis
Attorney, Agent, or Firm—Jones, Askew & Lunsford

[57] ABSTRACT

An improved color correction apparatus for improved color printing in a subtractive color printing system is disclosed. The disclosed apparatus utilizes an optimized three-dimensional look up table of pigment density values addressed by primary color values. The look up table is created by printing a plurality of pigment bars in response to known input density signals to a laser beam for each of three color pigments used in the system. Each of these sets of bars is subsequently scanned by the input scanner to determine the spectral content of the resultant bars and thus create a plurality of color pigment values corresponding to the spectral content of each bar for each color which is a complementary color of one of the pigments. These characteristics are used to calculate the spectral content of an actual printed image generated in response to an image generated by an input triplet to the system. Numerical methods are used to alter the pigment signal outputs, subsequently recalculate the spectral content of an actual image, and to repeat these steps until the error between the spectral content of an image pixel from the scanner and the spectral content of the reproduced printed image is minimized. In the resultant apparatus, input signals derived from the scanner are used to directly address the look up table and the data stored in the look up table directly drives a laser source in a laser-based electrophotographic print engine. The look up table thereby compensates for all non-linearities between the laser intensity modulator input signal and the final fusing process and further compensates, to the extent possible, for spectral impurities in the toner pigments used.

7 Claims, 6 Drawing Sheets

METHOD AND APPARATUS FOR PROVIDING IMPROVED COLOR CORRECTION IN A SUBTRATIVE COLOR PRINTING SYSTEM

TECHNICAL FIELD

The present invention relates to a color correction method for improved color printing in a subtractive color printing system.

BACKGROUND OF THE INVENTION

Color correction is a term most often applied to a technique or techniques for modifying color pictures for printing. With the advent of color electronic printing technologies, this technique has become increasingly important. There are two systems commonly used for production of color images: the additive color system and the subtractive color system. In the additive color system, colors are produced by the generation of light. To obtain a particular color in the additive color system, one adds more or less of one of the additive primary colors: red, green, and blue. Additive color systems are used most often in self-luminous color systems, such as cathode-ray-tubes and projection television.

On the other hand, subtractive color systems produce colors by selecting absorption of portions of the spectrum of an incident light source by certain dyes and pigments. Printing systems are primarily subtractive color systems. Cyan, magenta and yellow are the primary subtractive colors.

Ideally, when incident light is reflected off the pigment cyan, the red is subtracted. In other words, the pigment cyan subtracts all the red color out of light. In the same manner, the pigment magenta is related to green and the pigment yellow is related to blue.

In color electronic printing, differing quantities of cyan, magenta and yellow pigments are deposited on the final image receptor to create a color. Therefore, the resultant color is dependent upon the relative densities of the deposited pigments. Unfortunately, because color pigments are not ideal, the resultant color created rarely matches it's original. For example, when magenta is used, more than green is subtracted from white. Typically, magenta printing dyes subtract some amount of blue light and therefore can be considered to contain some yellow contamination. Because of these imperfections in the spectral content of toner pigments, the presence of "color contaminants" can cause an uncorrected reproduction to have hue shifts and often appear "muddy" or dark.

The basic problems associated with imperfect dyes have been recognized by others. In 1937, Neugebauer developed mathematical expressions to compensate for the color contaminants found in printing dyes. These expressions were based on the assumption that the image is comprised of colored dots or pixels of varying area which are randomly distributed over the image. Using the Neugebauer equations, the fractional areas of each colorant required to produce the original color were found.

The emergence of matrix imaging technologies has given new interest in developing halftoning techniques to suit these systems. Various types of matrix color printing technologies include thermal transfer, ink jet, and rasterscan electrophotography. In these systems, an image is again divided into very small dots, called pixels. The greater the number of pixels per inch, the higher the resolution of the resultant reproduction. Matrix technologies are unique in their ability to place dots of various colors, with identical area, in the same location. At each pixel, the color to be printed is composed of 1 to 3 dots from the substractive pigments placed on top of each other. However, because of this differing image structure, that is, constant instead of varying pixel area, the assumptions on which the Neugebauer equations were based are no longer valid.

Correct color reproduction is achieved if the original and reproduced colors match in lightness, (dark to light quality of the color) hue (blue, green, red, etc.), and saturation, (amount of gray present in a color). If the visible (non-filtered) density of two separate colors is identical, then their lightness is said to be equal. This is easily seen by a linear 1:1 tone reproduction curve ("TRC"). A TRC is the ploy of output density of the reproduction versus input density of the original. If the densities of two colors are similar as a function of wavelength across the visible spectrum, those colors are said to match hue and saturation as well as lightness.

Therefore, the cental nature of problems with maintenance of color integrity can arise from spectral impurities in the toner pigments and non-linear TRCs which are a result of both toner pigment characteristics and development/transfer characteristics. The term "development/transfer characteristics" refers to the entire system transfer function of characteristics between the input signal to a printing device and the final printed output. For example, the input signal to a laser source used for selectively discharging pixel areas of the photoreceptor of the machine and the efficiency of transfer of toner particles to the photoreceptor, and subsequent transfer of the toner particles to the image receptor to provide a final physical density of toner on the ultimate image receptor.

It should also be noted that the fusing characteristics of the plastic materials used in toners can effect the toner reproduction curve. The length of time the toner materials are in the fuser and the fuser temperature (that is, the amount of heat used to fuse the materials) can affect the TRC for a given set of toner materials. Thus, it should be noted when different types of image receptors are used which require different fuser heat transfer characteristics, the color characteristics of the resultant image can change. For example, if one has to use a subtractive color in an electrophotographic printing apparatus to create color transparencies for use on an overhead projector, most of the materials used for such transparencies require different fuser temperatures than most papers used in such machines.

In conventional printing processes, the visible spectrum is divided into three broad regions, namely, blue (400–500 nm), green (500–600 nm) and red (600–700 nm) and three density values from each region are measured (called the RGB value of the color). These filters correspond to the colorant pigments, cyan, magenta and yellow, respectively. According to Yule, since these separation filters are broadband (approximately 100 nm each), the additivity rule of densities applies. Simply stated, the additivity rule states that when several colorants are superimposed, the density of the combination is equal to the sum of the densities of the individual colorants. In mathematical form, this rule could be stated as follows:

$$Ro = f1(C) + f2(M) + f3(Y)$$

$$Go = f4(C) + f5(M) + f6(Y)$$

$$Bo = f7(C) + f8(M) + f9(Y)$$

where
Bo, Go, Bo = Original color
C = Cyan
M = Magenta
Y = Yellow
f1 ... f3 = (n) density through the Red filter where f2 and f3 are non-complement densities
f4 ... f6 = (n) density through the Green filter where f4 and f6 are non-complement densities
f7 ... f9 = (n) density through the Blue filter where f7 and f8 are non-complement densities The TRCs generated by real implementations of printers using real toner pigments have signficant regions of linearity, but suffer from significant non-linearities, primarily at points on the TRC curve of low density and where the density approaches its saturation level. These regions of non-linearity require correction to provide correct lightness rendition between original and reproduction. Correct hue and saturation rendition suffer from the "color contaminants" inherent in conventional printing pigments. For ideal toner pigments, the red output density would only be a function of the cyan pigment, the green output density would only be a function of magenta pigment and the blue output density would only be a function of the yellow pigment. Thus, those terms in the equations listed above with non-complement densities would tend to zero and drop out. Therefore, non-zero values for the non-complement densities represent the spectral impurities in the colorants. Furthermore, for a given subtractive color printing machine using a give set of toners, the f terms in each of the equations vary as a function of toner density and other factors which affect the resultant image color, such as heat transfer in the fuser. Naturally, the f values vary as a function of the pigment characteristics of the toner set being used. Non-linear TRC curves for the three colorants lead to different values for the f terms. Hence, measurement of the colorant densities along the TRC curve to create a number of f terms is required.

The system proposed by the Additivity Rule requires significant mathematical computation which creates real time design problems or slow image processing rates. In essence, the inventors of the present invention have discovered that the system appears to provide good first approximations of color correction signals. The insight of the present inventors was essentially to note what needs comparing, at any of a given set of densities, is how closely the actual resultant image RGB color elements approximate the desired $R_i$, $G_i$, $B_i$ input signals at each point in RGB color space. As used here in the concept of RGB color space is a mathematical three-dimensional space of varying values of red image spectral content, or red color value, green color value, and blue color value of the image. Red, green and blue filters of high spectral purity are much easier to create than complimentary color toner pigments of similar purity. Red, green and blue input signals to a laser printer can be created to virtually any desired precision. Therefore, it is the comparison of the input color values to the resultant output color values of the image which needs to be addressed for high quality color correction, particularly in the non-linear regions of the tone reproduction curves for the various pigment transfer and developing apparatus for a given subtractive color printing machine.

SUMMARY OF THE INVENTION

The present invention overcomes the prior art difficulties by obtaining high quality color prints using imperfect dyes. The preferred embodiment of the present invention is disclosed and used in the environment of a raster scan electrophotographic print engine. However, it should be understood that the present invention is usable in any pixel oriented subtractive color printing process or device including thermal printers, electrophotographic printers, electrostatic printers and ink jet printers. Additionally, the present invention will be useful in implementing other subtractive color printing processes yet to be invented. The preferred embodiment of the invention uses 300 pixels per inch. In such a low resolution machine, it is necessary for the color of each pixel to very closely approximate the color of the corresponding point in the original picture.

The time-consuming technique of calculating color correction equations applied to each pixel is avoided through the use of a look up table wherein a 24-bit (3-byte) point in a three dimensional matrix is addressed using the scanned density values as seen through the red, green and blue filters, i.e., the input RGB values. The 3-byte stored value contains one byte corresponding to the amount of cyan, magenta and yellow to be deposited on the ultimate print receptor or paper. The look up table is preferably created during initialization procedures performed on the machine. The technique does not need any special equipment nor does it require special training to complete.

The preferred embodiment of the present invention is implemented in a full color digital electrophotographic copying machine. Such machines scan image sources and digitize density levels through each of three primary color filters to generate color information for each pixel of the raster pattern used in the copier. In a conventional manner, an intensity modulated laser light source is used to selectively discharge areas of a uniformly charged photoreceptor in order to create an electrostatic image for each color component used in the system. Those skilled in the art will readily understand implementation of the conventional elements of the preferred embodiment including the scanner, control of the laser light source, the photoreceptors and composite image creation apparatus. The disclosed preferred embodiment uses a photoreceptor belt and a transfer belt to create the developed composite color image prior to transfer of that image onto the ultimate image receptor, i.e., the paper. Apparatus for accurately controlling registration in a full color electrophotographic print engine using a belt to carry the photoreceptor and a transfer belt is shown in U.S. Pat. No. 4,652,115.

The initialization procedure in the preferred embodiment first requires that a set of bars, preferably of equal width, be printed across a sheet of paper. From left to right, each bar will be in decreasing density of pigment deposited on the paper such that the first bar will have full density of pigment and the last bar will have no pigment. In the preferred embodiment all these bars for the three pigments are printed on a single sheet of paper. However, one sheet of barred paper may be printed for each pigment. The sheet is then run through each filter such that values are obtained at each density for each color seen through each filter. The purpose of running these colors through the scanner is to form a set of tables or matrices of color density values.

In the preferred embodiment, three 256×3 matrices or tables are derived from the above described scanning process in the following manner. First, one 256×3 table or matrix is created for each pigment. The 256 elements (numbered 0 through 255) correspond to each of the 256 discrete signal levels which may be output to intensity modulate the laser used in a machine embodying the preferred embodiment. The three numbers associated with each of the 256 output levels represent the color density values for the red, green, and blue color density derived from a pigment bar having one of the 256 possible densities. Thus, each of the three elements in the 256×3 tables will respectively represent the density seen through the red filter of that particular pigment bar, the density seen through the green filter of that particular pigment bar, and the density seen through the blue filter for that particular pigment bar.

As noted above, the preferred embodiment uses 16 printed color bars in the calibration process. The values for the remaining 240 density levels for each pigment are created by interpolation after the scanning of the 16 physically printed bars has been accomplished.

Thus, it will be appreciated that, for a given pigment density printed bar, the values $R_c$, $G_c$, $B_c$ are obtained by scanning the cyan pigment bar of that particular density successively through the red, green and blue filters. Similarly, values $R_m$, $G_m$ and $B_m$ are obtained by scanning the magenta bar of that particular density successively through the red, green and blue filters. Each of these is a color/pigment value for the particular density of the bar from which it was derived. The balance of the 256 color pigment densities for each pigment are obtained by interpolation. In the preferred embodiment of the present invention the density signals applied to the laser source for each toner, to create each pigment bar, differ from each other by a predetermined density difference value. Thus, it should be noted that in creating the bars any non-linearities between the electrical signal input to the laser source and the resultant physical density of the toner deposited on the final image receptor will be reflected in the acquired color/pigment values. Therefore, for each particular density (that is, input signal level to the laser) used in the calibration process, the color/pigment values in the resultant matrices reflect information on non-linearities in all of the following processes: the intensity modulator used in the laser, the discharge characteristics of the photoreceptor in response to incident light from the laser, the physical transfer of toner from the development modules to the photoreceptor, the transfer of toner from the developed image on the photoreceptor to the transfer belt, and the transfer of developed image from the transfer belt to the ultimate image receptor.

From the foregoing, it should be appreciated that for purposes of this specification, the concept of adjacent pigment bars varying in density by a predetermined density amount specifically refers to a predetermined amount of variation of the electrical input signal driving the laser. In other words, if one input signal differs from another by 10%, the resultant pigment bars will be considered to differ from each other by 10%. If there are any nonlinearities in the development/transfer characteristics, the actual physical density of the deposited material may not differ by exactly 10%. Specific incremental changes in input signal to the laser will normally provide corresponding specific incremental changes in the physical density of the deposited toner over a relatively wide range of input signal levels. However, it is not absolutely necessary that the pigment bars differ from each other by precise physical densities since the balance of the steps of the method will offset any non-linearities between signal level input and physical deposition of toner, so long as the relationship between the signal level and physical deposit of toner is monotonic.

It will be appreciated by those skilled in the art that embodiments of the invention and other subtractive color printing devices will be ones for which the concept of adjacent pigment bars varying in density by a predetermined amount refers to predetermined variations in the signal driving the pigment deposition density control apparatus of that particular machine. For example, the apparatus driving the thermal print head on a color thermal printer would have predetermined variations in the signal controlling the amount of heat to the print head which ultimately controls pigment deposition. It will also be appreciated by those skilled in the art that the scanning initialization and calibration process described in the preferred embodiment can be performed off-line by apparatus residing in machinery other than the printer, for creating the appropriate look-up table for use in a printer embodying the present invention.

In the present invention these color/pigment values are used to create a look up table which directly translates an input triplet in the form (red color value, green color value, blue color value) into an output pigment triplet in the form (cyan density value, magenta density value, yellow density value).

In the present invention, the color/pigment values are used to calculate the actual spectral content of the pixel which results from deposition of three densities of the three toner materials. Standard numerical methods are then used to calculate an error signal indicating the difference between the input triplet in RGB space and the image color triplet for that pixel in RGB space. Depending on the sense of the error signals, the values in the table for the output toner density values are adjusted and the output color triplet of the image is again calculated.

This process is repeated until either the error signal reaches an acceptable minimum value or the calulation has been done a predetermined number of times, past which it does not appear that any improvement in the error signal will be made.

The inventors of the present invention have analyzed curves describing each of the nine color pigment values for sets of commercially available cyan, magenta and yellow toner materials. A ploy of these characteristics can be made from the measured values of same by printing a plurality of pigment bars of varying densities described hereinabove. Naturally, for ideal toner materials, a plot of the color density versus pigment density for the pigments complimentary color would be a straight diagonal line and similar plots for the two other colors would be horizontal lines having a value of 255. As noted above, neither of these conditions hold true and the plot of color density to complimentary pigment density shows significant non-linearities. Additionally, a plot of the color density versus pigment density for the non-complimentary colors are both non-zero and non-linear. However, the inventors did discover that for all nine color pigment values, a plot of color density versus pigment density should be monotonic.

Thus, in the present invention the process of creating the look up table includes selecting an input triplet RGB space. Initial pigment values to be stored in the look up table are approximated by simply using the pigment values derived from the $R_c$, the $G_m$ and the $B_y$ terms. From this, the spectral content of the actual image is calculated using the other color/pigment values. For example, once the initial pigment density for cyan pigment is selected from the amount necessary to create the desired red spectral content (that is, a particular $R_c$ value), then corresponding values for $G_c$ and $B_c$ for the same cyan density are used in calculating the spectral content of the image. In a similar manner, the initial pigment densities for magenta and yellow are selected from the amount necessary to create the desired green and blue spectral content, respectively, and the resultant image and these are used for the first approximations. When this is done, corresponding $R_m$ and $B_m$, and $R_y$ and $G_y$ values, respectively, are used for calculating the spectral contents. The result of this calculation is another point in RGB space, that is, the RGB output triplet.

An error signal for each color is derived and an appropriate adjustment is made to the corresponding complimentary pigment value then existing in the table. The calculation of the actual spectral content of the image which would result from using these pigment density values is then made. The process of comparing the resultant spectral output of the image actually created by using these particular pigments densities to the input spectral content in RGB space is repeated until the error signal reaches the minimal resolution of the digital representation of the color values, or until the process has been repeated a predetermined number of times, twenty-five (25) in the preferred embodiment.

In other words, the present invention generates a look up table which directly maps a plurality of input points in RGB space to a plurality of output points in cyan, magenta, yellow pigment space, or CMY space. By using the color pigment values to iteratively test how closely the spectral content of the resultant images actually approximates the input spectral signal, the adjustments to the pigment values compensate for non-linearities in the TRC and minimize the effects of spectral impurities in the toner pigments. A predetermined number of pigment bars are printed and scanned to provide the color pigment values for the bars of those particular densities. In the preferred embodiment, additional color pigment values are obtained by interpolation.

Once this table is created, input color signals are quantized to a level which corresponds to one of the actual R, G, B, values for a point in RGB space, which value corresponds to a particular address in the look up table. The look up table generated as described above directly provides the pigment density signals used to control the toner modules. In the preferred embodiment, each color and RGB space is quantized in thirty-two (32) different levels. Thus, the table contains $32^3$ entries and requires 32K addresses. At each of the 32K addresses 24 bits, or 3 bytes are stored. It will thus be apparent that the look-up table may be physically embodied as three parallel 32K by eight memories or any memory arrangement in which 32K logical addresses will address three 8-bit words which may be provided as output.

The preferred embodiment, like many color electrophotographic printing machines, represents input color values in 8-bit numbers. At first glance it might appear that precision in the output spectrum has been sacrificed for the sake of creating a look up table of manageable size since, in theory, $256^3$ possible colors can be created. However, the inventors of the present invention have found that the 32K colors are mort than adequate to give very high quality color reproductions. Furthermore, the improvement in spectral accuracy of the output image which results from use of the method and apparatus of the present invention offsets any loss of resolution which one might assume would occur from quantizing the 256 levels of input for each color down to 32 levels. In other words, the greater accuracy of taking an input point in RGB space and actually calculating a corresponding set of pigment densities which most closely approximates that spectral content on the output image greatly improves the overall appearance of the resulting color print. Indeed, minimizing the effects of spectral impurities by actually calculating the spectral content of the output image, rather than selecting one of a particular set of matrices which could then be inverted and used to adjust 8-byte input numbers, is a key element of the insight and novelty of the present inventors.

From the foregoing, it will be appreciated that any changes in machine operating characteristics or toner characteristics can be offset by recalibrating the particular machine in the manner described hereinabove. While in the preferred embodiment calibration is a somewhat lengthy process, taking approximately 30 minutes, the calibration remains good so long as toner material characteristics remain constant, the development/transfer characteristics of the machine do not change significantly, and the fuser characteristics remain substantially constant. In cases in which it is desired to print color images on an image receptor requiring higher fuser temperatures, such as color transparencies for use in overhead projectors, the machine can be recalibrated prior to the job. Alternatively, the machine can be calibrated to two or more alternate look up tables for different jobs. This is simply a trade-off of the cost of the additional memory to store additional look up tables versus how frequently the user of a particular machine may wish to recalibrate.

From the foregoing, it will be appreciated that the look up table, once created, provides quick and accurate color reproduction using an inexpensive process and inexpensive and imperfect toner pigments.

Therefore, it is an object of the present invention to provide an improved method and apparatus for providing color correction in a color subtraction printing machine. It is further objection of the present invention to provide a color correction system which provides minimum possible difference between a desired spectral point in RGB space and an actual resultant point in RGB space for a given set of toner pigments.

It is a further object of the present invention to provided a color correction system for subtractive color printing apparatus which employs a look up table directly providing pigment triplet value output from color value input triplets without the necessity of real time computation during the image creation process.

It is a further object of the present invention to provide a color correction system for which alternative tables, which correspond to predetermined alternative machine operating states may be stored and selectively used depending on the operating state of the machine.

That the present invention provides these and other improvements in color correction will be appreciated from the detailed description of the preferred embodiment below.

BRIEF DESCRIPTION OF THE DRAWINGS

FIG. 3 is a view of a portion of a sheet of paper with barred pigment deposits contained thereon.

DETAILED DESCRIPTION

Figure 1:
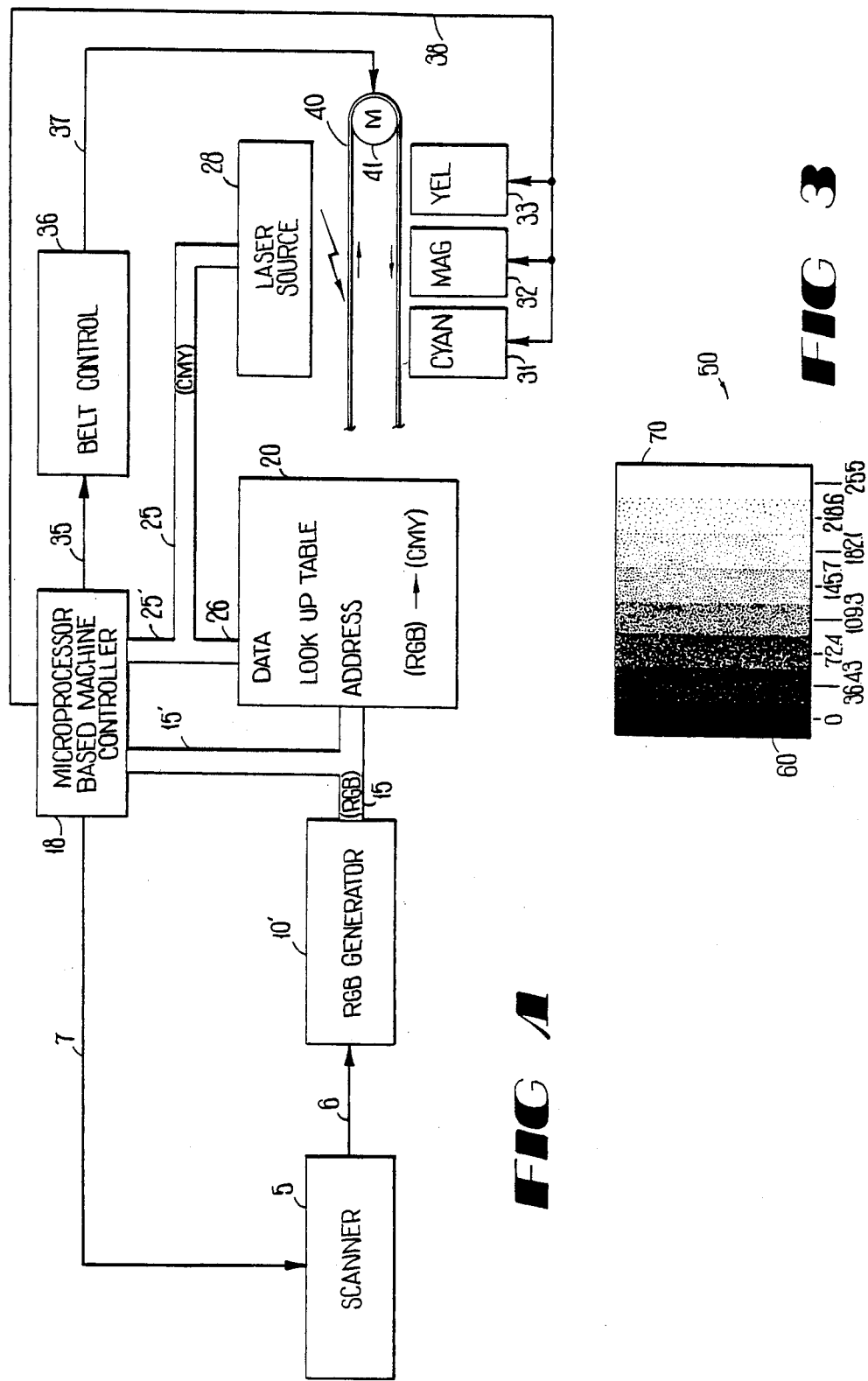
FIG. 1 is a block diagram of the preferred embodiment.

Turning now to the various drawing figures in which like numerals reference like parts, a detailed description of the preferred embodiment will be provided. A block diagram of the basic architecture necessary for the present invention is shown in FIG. 1. Scanner 5 scans the image to be reproduced three times, one for each of three filters: a red filter, a green filter and a blue filter (not shown). It will therefore be appreciated that scanner 5 is of conventional construction for a scanner for a color digital copying device.

The analog output from scanner 5 appears on line 6 as the input to RGB generator 10. RGB generator 10 simply represents circuitry which performs the analog-to-digital function normally associated with digitizing a density level signal from the scanner and provides the quantization of the RGB density signal into one of 32 levels and controls the creation of appropriate addresses on RGB bus 15. It should be appreciated that RGB bus represents 15 address lines used to address the 32K locations of look up table 20.

During the scanning and initialization process, eight lines of bus 15 carry an 8-bit number for the R, G, or B value for the pigment bar and filter combination then being scanned. This value is stored as one value of the three 256×3 sets of color/pigment values derived from the scanning and interpolation process. Thus, the full 8-bit dynamic range from the output of scanner 5 is used during acquisition of the color/pigment values during calibration.

It will be appreciated by those skilled in the art that block 10 also represents the function of successive acquisition of one of the 32 possible R values, G values, and B values during scanning of an image for printing, once calibration is completed. Therefore, five bits of the 15-bit address are acquired during scanning with the red filter, five during scanning with the green filter, and five during scanning of the blue filter. When this area is being printed after scanning, this 15-bit address is provided to lookup table 20 during the process of laser scanning of photoreceptor 40 for that particular pixel, for each separated color image.

The basic control element of the preferred embodiment is shown as microprocessor-based machine controller 18. This apparatus includes the normal control apparatus for an electrophotographic printer, such as that disclosed in U.S. Pat. No. 4,652,115. Additionally, the microprocessor within controller 18 is used to perform numerical calculations associated with the present invention, as described hereinbelow.

Line 7 is shown as running from microprocessor-based controller 18 back to scanner 5. This simply indicates that scanner 5 is controlled in synchronism with the other elements of the machine in a conventional manner. As is known to those skilled in the art, the controller 18 is able to keep track of the present location on the image source being scanned by scanner 5. In this manner, microprocessor-based controller 18 is able to keep track of the particular one of the calibration pigment bars being scanned during the initialization process.

An extension of RGB bus 15 is shown at 15', and leads to controller 18. It will be immediately apparent to those skilled in the art that this represents an implementation of the address bus of controller 18 which is used to address data in look up table 20 during the printing functions, after the initialization process has taken place. Data bus 25' extends from microprocessor 18 to the data inputs of look up table memory 20, as shown at 26 in FIG. 1. During the initialization process, data for a particular point in RGB space, that is, data for a particular address on RGB bus 15, is used by the microprocessor controller 18 to calculate the image spectral content for the particular set of densities represented by the address on bus 15. As described in detail hereinbelow, the processor of controller 18 then uses known numerical methods to change the values of the output pigment triplet and to again calculate spectral contents of the output image. This process is repeated until an acceptable error level has been reached (or a predetermined number of iterations has occurred) and the new adjusted values for the output pigment triplet are provided on bus 25' to look up table 20 for storage and subsequent use during printing. Line 35 leads from controller 18 to belt control block 36 the output of which appears on line 37 which takes it on the motor 41. These elements represent the conventional belt control functions which are executed under the control of microprocessor-based machine controller 18.

Additionally, line 38 from controller 18 to toner modules 31 through 33 show that, in a conventional manner, controller 18 controls activation of the cyan, magenta, and yellow developer modules at appropriate times during the machine printing cycle.

An extension of bus 25' is shown as bus 25 in FIG. 1. This provides cyan, magenta and yellow density signals to laser source controller 28. In the preferred embodiment, the cyan, magenta and yellow densities are each represented by eight bit binary numbers. The value of the binary number appearing on line 25 controls the intensity modulators associated with laser source 28.

During the initialization process, controller 18 provides a sequence of predetermined numbers on bus 25' which carries them on to bus 25 to control laser source 28. Laser source 28 then scans a predetermined portion of the photoreceptor belt 40 to create electrostatic images corresponding to areas of predetermined density on the photoreceptor belt. This process is repeated for each of the three toner pigments.

In a conventional manner, each of the sets of pigment bars is developed by activation of toner modules 31 through 33. The resultant image is then transferred to a transfer belt (not shown) and onto a final image receptor such as a piece of paper (not shown), and developed by the machine's fuser (not shown) in an entirely conventional manner. When this printing has been completed, the resultant developed pigment bars are placed under scanner 5 and scanned in the manner described elsewhere in this specification.

When this scanning process is taking place, the color/pigment values are being acquired for storage in look up table 20. Under these circumstances, operation of scanner 5 is controlled by the signals carried over the path represented by line 7. During scanning, each bar is scanned successively through one of the three filters (not shown) in scanner 5. An 8-bit number representing the scanned density level is provided as the output of RGB generator 10 on eight lines of bus 15. This is stored in random access memory associated with controller 18. When the scanning process is completed, 32 3-byte entries of the 256×3 table for each pigment bar have been generated representing the red, green, and blue density signals for the scanning of a particular bar of a particular density.

The next step in the process is creation of the balance of the 256 entries for each pigment by a process of interpolation until all three 256×3 tables of color pigment values have been created. This is described in detail hereinbelow.

When this has been completed, creation of the appropriate data for storage in lookup table 20 begins. First, one of the possible 32K addresses representing one of the 32K points in RGB space is selected. From this, initial guesses for the pigment density signal values are selected by going to the color pigment value tables and selecting a cyan pigment value based on the red input signal, a magenta input value based on the green input signal, and a yellow pigment value based on the blue input signal. Note that in the foregoing sentence each input signal corresponds to five bits of a particular 15-bit address of lookup table 20. Next, the actual spectral content of an output pixel using the three selected pigment densities is calculated. Numerical methods, described in detail hereinbelow, are then used to iteratively modify the pigment density signals until the error between the spectrum defined by the input point in RGB space in this point in RGB space representing the spectral content of the printed image for a pixel using the three calculated toner densities is minimized. This process is repeated for each of the 32K addresses of lookup table 20 until the entire lookup table has been filled. When this is completed, look up table 20 is completely loaded with data representing cyan, magenta and yellow output densities.

During subsequent operation of the machine, the following takes place. The original image is placed under scanner 5 and scanned in a conventional manner. Output from the scanner appears on line 6 and is quantized by RGB generator 10 to provide a 15 bit address on RGB bus 15 for each pixel. During the development of each composite image, the RGB address for the particular pixel then being developed is provided on bus 15' to the address inputs of look up table memory 20. Look up table memory 20 directly outputs CMY density values on bus 26. Eight of the 24 bits stored in look up table 20 at that particular address are associated with a particular pigment for the separated image then being developed. These eight bits are provided on bus 25 to control laser source 28 for that pixel.

In other words, if the cyan image for a particular pixel is being developed, the complete RGB address for the RGB point detected at that pixel by scanner 5 is provided as an input to look up table 20. During raster scanning of photoreceptor 40 for development of the cyan image, the eight bit word on bus 25 represents the cyan pigment density value. Thus, the electrostatic image which results for that pixel on photoreceptor 40 directly corresponds to the amount of cyan toner which should be deposited on the photoreceptor. As this pixel on photoreceptor 40 passes over cyan toner module 31, toner is lifted from the development module 31 and adheres electrostatically to photoreceptor 40 according to the charge on the photoreceptor at that particular pixel location.

Subsequently, two similar operations occur for the magenta and yellow development of that particular pixel area with the composite developed image being transferred to the transfer belt (not shown).

Thus, it will be appreciated in the present invention once calibration of the look up table has taken place, look up table 20 is used to directly convert RGB output values from the scanner (after processing through RGB generator 10) into CMY signals on bus 25 for driving laser source 28.

From the foregoing, it will be appreciated that scanner 5 shown in FIG. 1 constitutes an input means for provding first, second and third image color signals from an image source. Furthermore, RGB generator 10 and its associated memory represent a translation means for generating an address signal in response to the first, second and third image color signals from scanner 5. Lookup table memory 20 is a corrected color lookup table connected to the translation means of RGB generator 10 for providing a predetermined output triplet in the form (first pigment, second pigment, third pigment) in response to each address signal. Photoreceptor belt 40, laser source 28, controller 18, and the transfer and fuser mechanisms (not shown) constitute control means for causing toner modules 31 through 33 to deposit respectively first, second and third densities of the toners contained therein onto the ultimate image receptor, such as a piece of paper. In this arrangement, each of the deposited toner densities correspond to respectively members of the above described pigment triplet.

Figure 2:
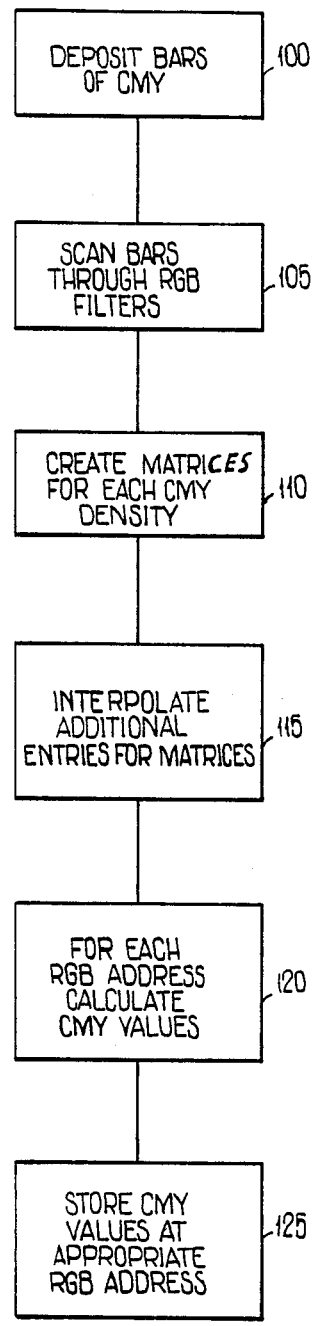
FIG. 2 is a flow diagram for the procedure which creates the look up table.

To generate look up table 20, it is necessary to perform an initialization procedure. FIG. 2 flowcharts the steps necessary for initialization. The first step 100 requires the machine to deposit bars of various densities of each of the subtractive primary colors onto an image receptor. FIG. 3 shows an example of such bars. Barred pattern 50 is a portion of a sheet of copy paper and leftmost bar 60 represents toner deposited when the toner module is full open. Bar 60 would be assigned a density value of 0. A value of 0 is defined for full pigment because in an ideal additive (RGB) color system there would be no density of the additive primary color corresponding to the subtractive primary pigment in the toner. Rightmost bar 70 represents no toner deposited when the toner module is in the full close position. Bar 70 would be assigned a density value of 255 because bar 70 would have the highest density of the corresponding additive primary color. Each of the bars in between represents an equal percentage denser deposit of toner.

It is necessary that pattern 50 proceed through the full process of printing, including fusing, so all effects of the printing apparatus will be taken into account in deriving look up table 20. In this manner, color correction for contaminants in the pigments contained in toner modules 31, 32 and 33, color correction for changes in colors due to the fusing apparatus and color correction for other color changes inherent in the printing apparatus become corrective functions inherent in look up table 20.

After having printed pattern 50 for each subtractive pigment, patterns 50 are scanned through scanner 5. This is shown as step 105 in FIG. 2. A key operator with a color copier would print the three toner colors, cyan, magenta, and yellow, in barred pattern onto a sheet of copy paper, then take the paper and place it on the platen for scanning.

Barred patterns 50 are then scanned on scanner 5 through each of three color filters: red, green and blue. This derives values at each of the density levels for red in the cyan, red in the magenta, red in the yellow, blue in the cyan, green in the magenta, green in the yellow, blue in the cyan, blue in the magenta and blue in the yellow as seen at step 110. At each density level, these values are elements of the color/pigment density matrix, M(CMY), represented as:

$$R_c\ G_c\ B_c$$
$$R_m\ G_m\ B_m$$
$$R_y\ G_y\ B_y$$

where $R_c$ is the cyan density seen through the red filter, $G_c$ is the cyan density seen through the green filter, etc.

Figure 4:
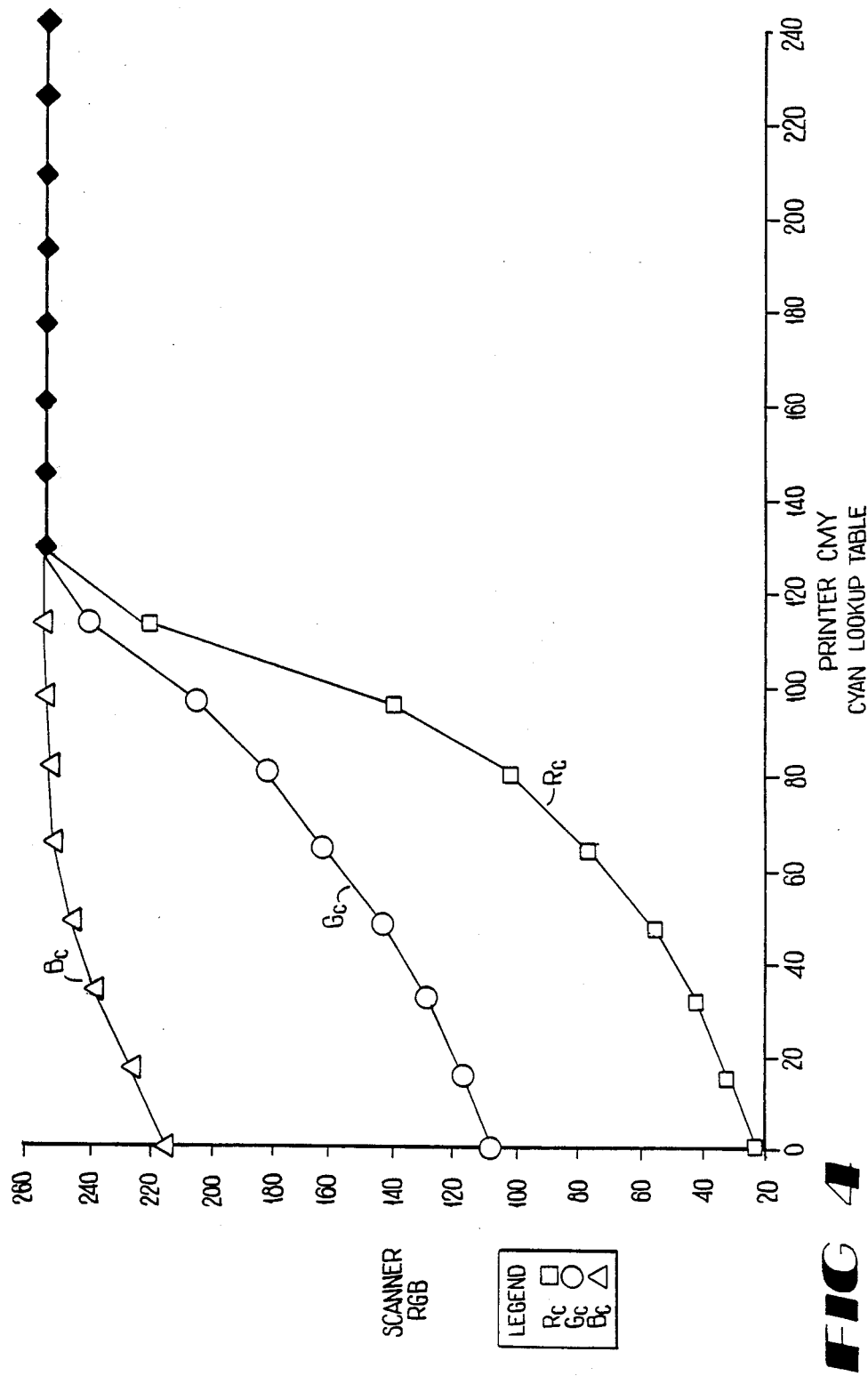
FIG. 4 is a graph of the density of cyan deposited in the barred pattern of FIG. 3 as seen through the red, green and blue filters.

There is one color/pigment density matrix created for each bar of pigment appearing in pattern 50. In the preferred embodiment, 16 bars are used. Taking each element of the color/pigment density matrix and plotting it with the corresponding indices of the other matrices, one can graph the color/pigment density as a function of the pigment density. FIG. 4 shows the plotting of the 16 scanned densities of red, green and blue in the cyan pigment. The X axis shows the various densities of cyan from zero (which is full density) to approximately 240. It will be noted that the distance between each graphed point is equal. This is because the difference in densities of the 16 bars in pattern 50 (FIG. 3) is equal.

The Y axis in FIG. 4 plots the scanned densities of red, green and blue. The density of red in cyan ($R_c$) is represented by the squares and is the lowermost line. The density of green in cyan ($G_c$) is represented by circles and in the middle line. The density of blue in cyan ($B_c$) is represented by triangles and is the uppermost line.

Figure 5:
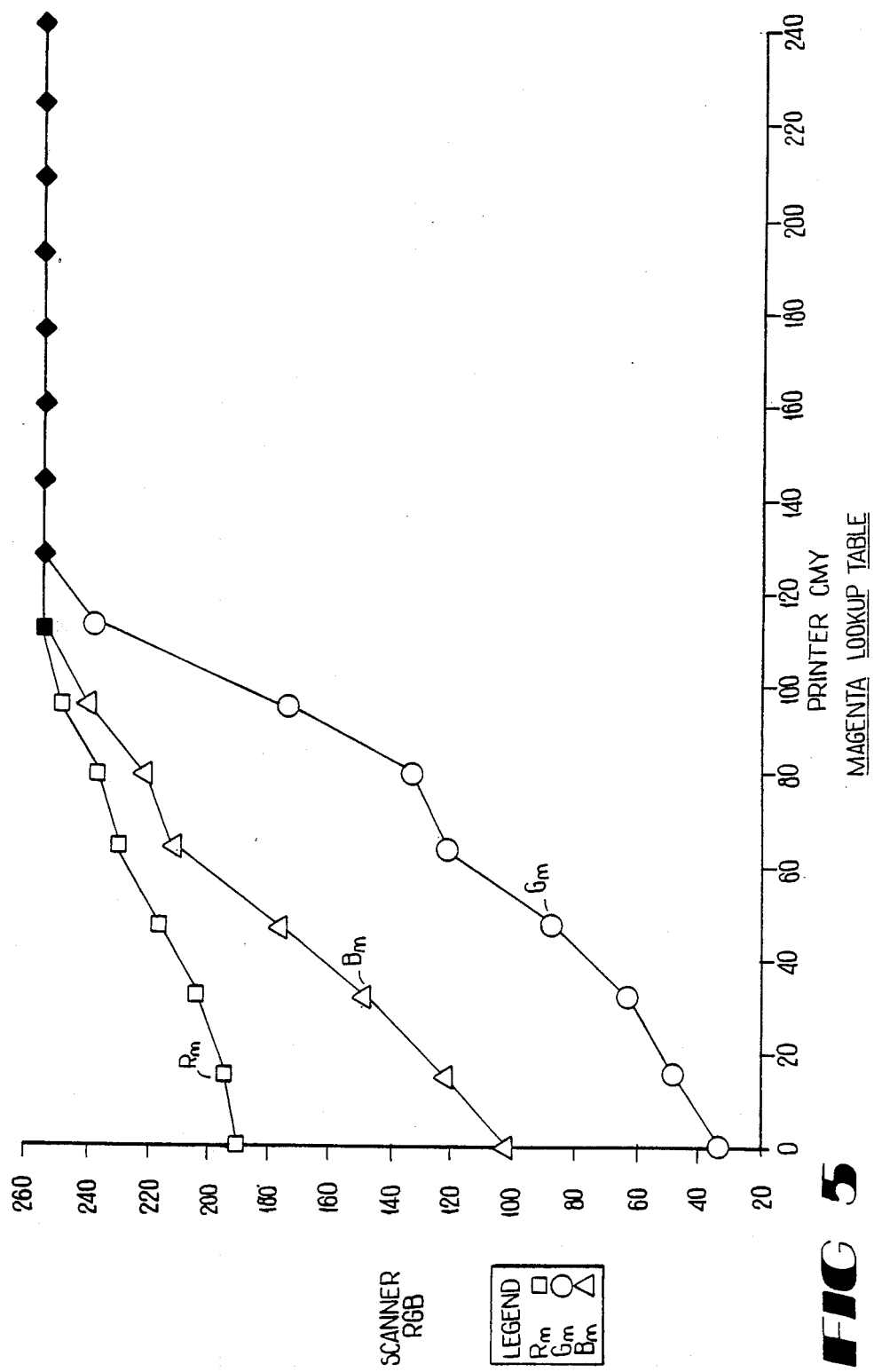
FIG. 5 is a graph of the density of magenta deposited in the barred pattern of FIG. 3 as seen through the red, green and blue filters.
Figure 6:
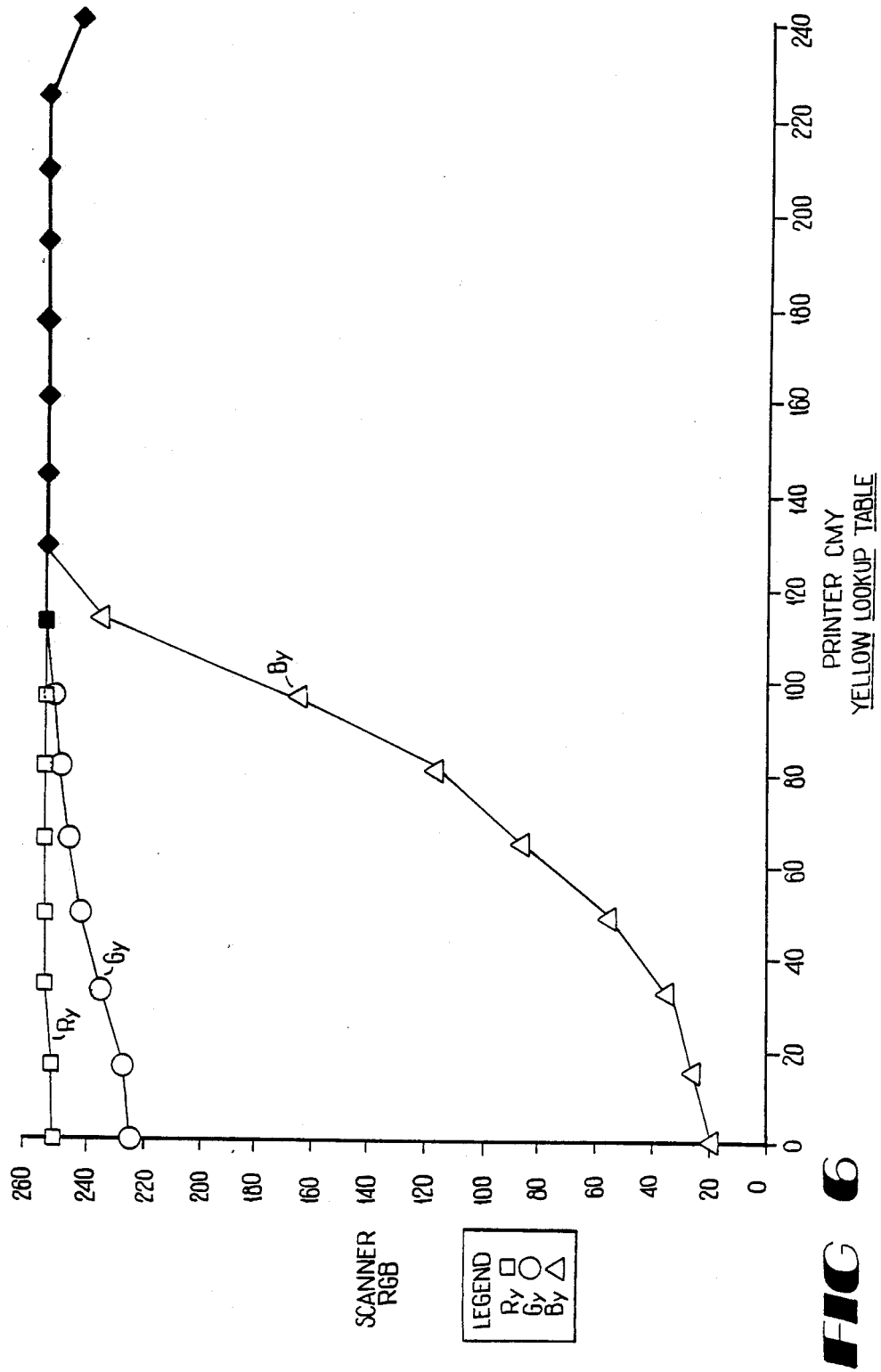
FIG. 6 is a graph of the density of yellow deposited in the barred pattern of FIG. 3 as seen through the red, green and blue filters.

As the density of cyan decreases, i.e., the density number of cyan increases, the scanned values of red, green and blue become negligible. In an ideal situation, a plotted graph for the density of red in cyan would graph as a straight line in a one-to-one relationship. The densities of green and blue in cyan would be negligible across the range of cyan densities. In like manner, a magenta look up table and a yellow look up table are represented in FIGS. 5 and 6, respectively. It will be noted that in an ideal situation, the density of green in magenta would graph as a straight line with a slope of 1 and a density of blue in yellow would graph as a straight line with a slope of 1. From the graphs, it can also be seen that there is considerable contamination of green in the cyan and red and blue in the magenta.

As is readily apparent to one skilled in the art, the greater the number of points plotted on the graph, i.e., the greater the number of bars of pigment deposited in pattern 50, the greater the accuracy in mapping the color/pigment density functions. On the other hand, the greater the number of bars of pigment deposited in pattern 50, the lesser the width of each bar. The width of each bar will have an effect upon the accuracy of the color/pigment density readings when scanned by scanner 5 (FIG. 1).

In the preferred embodiment, an additional step 115 is performed. Through mathematical interpolation, additional color/pigment density values are derived. These density values are interpolated such that for all density values of cyan from 0 to 255 there are values for the density of red in the cyan, the density of green in the cyan, and the density of blue in the cyan. This forms a 256×3 matrix to store the color/cyan density values. (CMAT). In a like manner of interpolation, two more 256×3 matrices are created, one to store the color/magenta density values (MMAT) and one to store the color/yellow density values (YMAT). These matrices are used for the calculations performed at step 120.

In performing the calculations at step 120, corresponding cyan, magenta and yellow values are found for a predetermined number of red, green and blue values. If 256 values of each of red, green and blue are used to address stored values in lookup table 20, there would be almost 7,000,000 addresses within lookup table 20. Such a large table would require a correspondingly large amount of time to search. In the preferred embodiment, 32 equally spaced values of each of red, green and blue are used as addresses within lookup table 20. This creates $32^3$ or 32,768 RGB addresses in look up table 20 (FIG. 1). After calculation of appropriate cyan, magenta and yellow values, for each address, these values are stored at the corresponding RGB address as seen in step 125.

Figure 7:
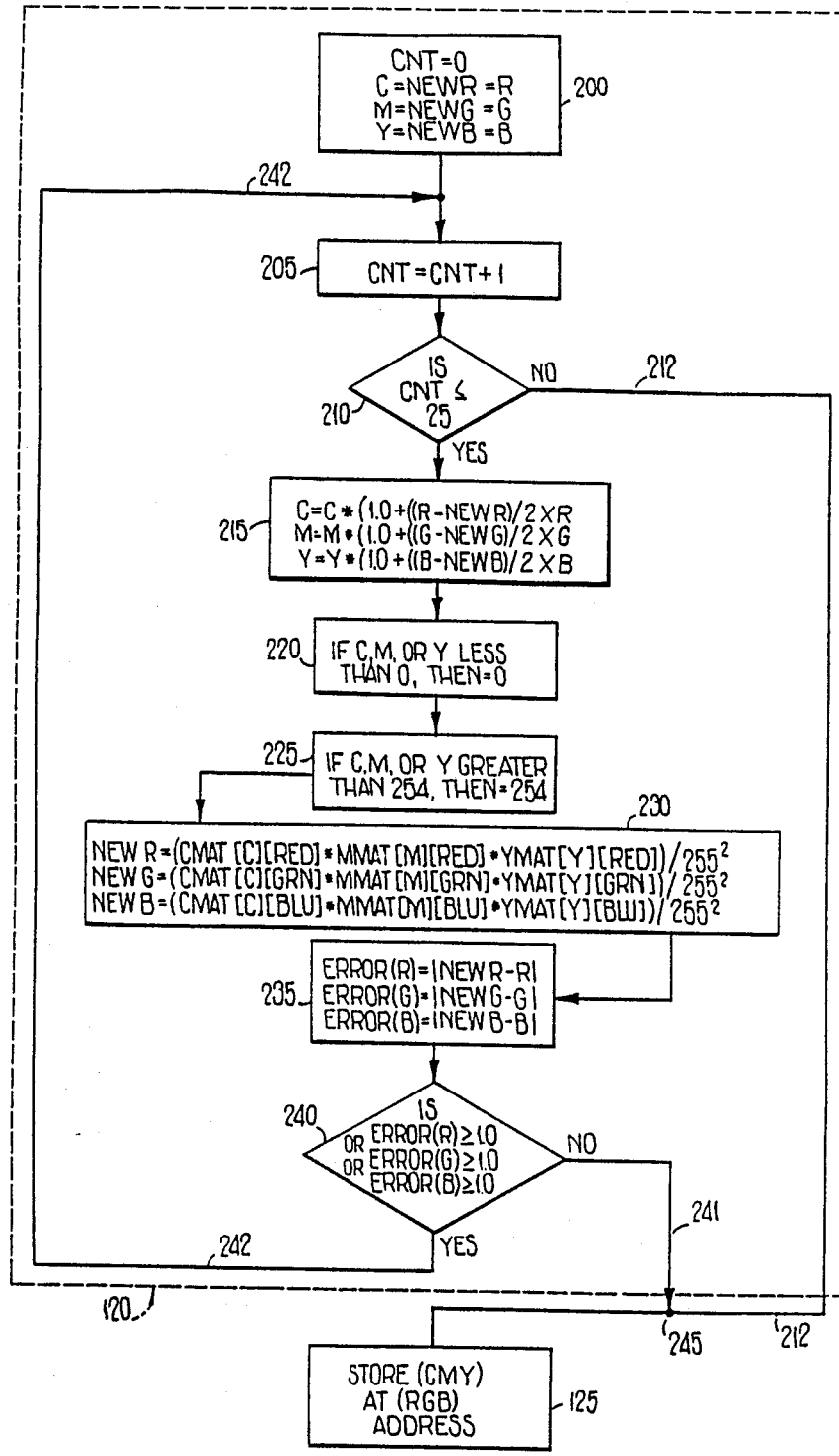
FIG. 7 is a flow diagram for the calculations performed in a portion of FIG. 2.

FIG. 7 is a flow chart of the calculations which take place at step 120 (FIG. 3). CNT is a counter which is initially set to zero at step 200. AT 200, the projected cyan, magenta and yellow values (C, M, and Y, respectively) are set equal to the red, green and blue (R, G and B) values, respectively. R, G and B are integer values which will address the calculated C, M and Y values. Also, at 200, the red, green and blue values which are calculated from the cyan, magenta and yellow values (NEWR, NEWG and NEWB) are set equal to R, G and B.

At 205, CNT is incremented by one. Counter CNT tracks the number of iterations which are done to approach a minimal error between calculated NEWR, NEWG and NEWB and addresses R, G and B. If CNT at 210 is greater than 25, meaning that 25 iterations have been performed and the error is not small enough to allow (C M Y) to be stored at address (R G B), then, following path 212 no more iterations are performed and (C M Y) is nevertheless stored at address (R G B) at 125.

If CNT is less than or equal to 25, a new cyan value, C, is calculated by multiplying the old value times $(1.0+((R-NEWR)/R\times 2))$. Likewise, at 215, a new magenta value and a new yellow value are calculated in similar manners. Step 220 checks to see if the resultant cyan, magenta or yellow value is less than zero. If C, M or Y is less than zero, then it is set to zero. At 225, C, M and Y are checked to see if they are greater than 254. If so, then whichever value is greater than 254 is set equal to 254. In this manner, the cyan, magenta and yellow values are never allowed to be outside the range of zero to 254.

At step 230, calculations are performed using the three 256×3 color/pigment density value matrices which were derived at interpolation step 115 (FIG. 2): CMAT, MMAT and YMAT. For each of new red, green and blue values (NEWR, NEWG, and NEWB, respectively) the red, green and blue values from the three 256×3 matrices are multiplied together and scaled in the following manner:

$$NEWR = (CMAT[C][1] \times MMAT[M][1] \times YMAT[Y][1])/65025$$

$$NEWG = (CMAT[C][2] \times MMAT[M][2] \times YMAT[Y][2])/65025$$

$$NEWB = (CMAT[C][3] \times MMAT[M][3] \times YMAT[Y][3])/65025$$

where CMAT, MMAT and YMAT are the cyan 256×3 matrix, the magenta 256×3 matrix, and the yellow 256×3 matrix, respectively. The scaler, 65025, is equal to $255^2$ so that if all of the matrix entries are 255, the highest value for NEWR is 255. The matrix values correspond to the density of each color in the pigment at a hypothetical bar corresponding to the pigment index value, where the color index values of 1, 2 and 3 reference red, green and blue, respectively. For example, a matrix entry referenced by CMAT [55] [2] would indicate the density of green in a hypothetical cyan bar of value 55.

At 235, the error between the newly calculated red value and the address red value is found and ERROR (R) is set equal to the absolute value of that error. Likewise, ERROR (G) and ERROR (B) are calculated. Decision 240 is a step whereby all the errors are examined to see if any of them are greater than 1.0. If so, another calculation is performed by returning to step 205 via path 242. Only if all three errors in the red, green and blue values are less than 1.0 will the program proceed via path 241 and join up with path 212 at point 245 proceeding to step 125 where (C M Y) is stored at address (R G B). For 32 matrices which are used to calculate 32,768 (C M Y) triplets, the preferred embodiment takes approximately 30 minutes. Once the look up table is stored, the initialization procedure need not be repeated unless some major part of the printing process is changed. An example of this would be changing the brand of pigment toner used.

From the foregoing description of the preferred embodiment, it will be appreciated that the present invention overcomes the drawbacks of the prior art and meets the objects of the inventions cited hereinabove. In view of the teachings of this specification, other alternative embodiments will suggest themselves to thoses skilled in the art and therefore the scope of the present invention is to be limited only by the claims below.

We claim:

1. A method of creating a corrected color control table for use in a subtractive color printing system comprising the steps of:
   (1) providing a first toner of a first pigment, a second toner of a second pigment, and a third toner of a third pigment;
   (2) printing a first set of N pigment bars of said first toner on a first predetermined segment of an image receptor, each of said first set of bars having a predetermined density value and N being an integer greater than one;
   (3) printing a second set of N pigment bars of said second toner on a second predetermined segment of an image receptor, each of said second set of bars having a predetermined density value;
   (4) printing a third set of N pigment bars of said third toner on a third predetermined segment of an image receptor, each of said third set of bars having a predetermined density value;
   (5) scanning each of said first, second and third sets of bars through a filter of a first color, a filter of a second color, and a filter of a third color to obtain a plurality of color/pigment values, each of said color/pigment values representing a density value for a particular one of said first, second and third colors from a particular bar of a particular one of said three pigments;
   (6) creating a value table having at least $N^3$ entries of a plurality of input triplets, each of said input triplets being of a form: first color, second color, third color, into which a corresponding plurality of pigment triplets is mapped, each of said pigment triplets being of a form: first pigment, second pigment, third pigment;
   (7) for each of said plurality of input triplets;
      (a) calculating an output triplet by calculating color contributions for each of said three colors from each of said three pigments using a corresponding pigment triplet mapped by said input triplet and said color/pigment values;
      (b) calculating an error value for said input triplet, said error value representing a mathematical difference between said input triplet and said output triplet;
      (c) modifying said corresponding pigment triplet and repeating steps (a) and (b) until either said error value is less than a predetermined error value or said steps (a) and (b) have been repeated a predetermined number of times;
   (8) storing said value table for use in said subtractive color printing system.

2. A method of creating a corrected color control table as recited in claim 1 wherein said color/pigment values created at step (5) are measured color/pigment values and step (5) is followed by the steps of:
   creating a predetermined number of additional color/pigment values by interpolation between said measured color/pigment values.

3. A method of creating a corrected color control table as recited in claim 1 wherein:
   for step (2) each of said first set of N pigment bars differs in density from an adjacent one of said first set of N pigment bars by a predetermined density difference;
   for steps (3) each of said second set of N pigment bars differs in density from an adjacent one of said second set of N pigment bars by said predetermined density difference; and
   for step (4) each of said third set of N pigment bars differs in density from an adjacent one of said third set of N pigment bars by said predetermined density difference.

4. A method of correcting color in a subtractive color printing system comprising the steps of:
   (1) providing a first toner of a first pigment, a second toner of a second pigment, and a third toner of a third pigment;

(2) printing a first set of N pigment bars of said first toner on a first predetermined segment of an image receptor, each of said first set of bars having a predetermined density value and N being an integer greater than one;

(3) printing a second set of N pigment bars of said second toner on a second predetermined segment of an image receptor, each of said second set of bars having a predetermined density value;

(4) printing a third set of N pigment bars of said third toner on a third predetermined segment of an image receptor, each of said set of bars having a predetermined density value;

(5) scanning each of said first, second and third sets of bars through a filter of a first color, a filter of a second color, and a filter of a third color to obtain a plurality of color/pigment values, each of said color/pigment values representing a density value for a particular one of said first, second and third colors from a particular bar of a particular one of said three pigments;

(6) creating a value table having at least $N^3$ entries of a plurality of input triplets, each of said input triplets being of a form: first color, second color, third color, into which a corresponding plurality of pigment triplets is mapped, each of said pigment triplets being of a form: first pigment, second pigment, third pigment;

(7) for each of said plurality of input triplets;

(a) calculating an output triplet by calculating color contributions for each of said three colors from each of said three pigments using a corresponding pigment triplet mapped by said input triplet and said color/pigment values;

(b) calculating an error value for said input triplet, said error value representing a mathematical difference between said input triplet and said output triplet;

(c) modifying said corresponding pigment triplet and repeating steps (a) and (b) until either said error value is less than a predetermined error value or said steps (a) and (b) have been repeated a predetermined number of times;

(8) storing said value table in said subtractive color printing system;

(9) providing first, second, and third image color signals from an image source; and

(10) applying said first, second, and third image color signals as said input triplet to said value table and using said pigment triplet mapped thereby to control deposition of said first pigment, said second pigment, and said third pigment on output image receptors.

5. A method of creating a corrected color control table for use in a subtractive color printing system comprising the steps of:

(1) providing a first toner of a cyan pigment, a second toner of a magenta pigment, and a third toner of a yellow pigment;

(2) printing a first set of 16 pigment bars of said first toner on a first predetermined segment of an image receptor, each of said first set of bars having a predetermined density value, each of said predetermined density values differing from a respective one of said predetermined density values for an adjacent one of said pigment bars by a predetermined density difference;

(3) printing a second set of 16 pigment bars of said second toner on a second predetermined segment of an image receptor, each of said second set of bars having a predetermined density value, each of said predetermined density values differing from a respective one of said predetermined density values for an adjacent one of said pigment bars by said predetermined density difference;

(4) printing a third set of 16 pigment bars of said third toner on a third predetermined segment of an image receptor, each of said third set of bars having a predetermined density value, each of said predetermined density values differing from a respective one of said predetermined density values for an adjacent one of said pigment bars by said predetermined density difference;

(5) scanning each of said first, second and third sets of bars through a red filter, a green filter, and a blue filter to obtain a plurality of color/pigment values, each of said color/pigment values representing a density value for a particular one of said red, green, and blue colors from a particular bar of a particular one of said cyan, magenta, and yellow pigments;

(6) creating a value table having at least 4096 entries of a plurality of input triplets, each of said input triplets being of a form: red value, green value, blue value, into which a corresponding plurality of pigment triplets is mapped, each of said pigment triplets being of a form: cyan value, magenta value, yellow value;

(7) for each of said plurality of input triplets;

(a) calculating an output triplet in a form: red output value, green output value, blue output value by calculating color contributions for each of said three colors from each of said three pigments using a corresponding pigment triplet mapped by said input triplet of said color/pigment values;

(b) calculating an error value for said input triplet, said error value representing a mathematical difference between respective red, green, and blue values of said input triplet and said output triplet;

(c) modifying said cyan pigment value in said corresponding pigment triplet by multiplying same by $1+($red value$-$red output value$)/(2\times$red value$)$;

(d) modifying said magenta pigment value in said corresponding pigment triplet by multiplying same by $1+($green value$-$green output value$)/(2\times$green value$)$;

(e) modifying said yellow pigment value in said corresponding pigment triplet by multiplying same by $1+($blue value$-$blue output value$)/(2\times$blue value$)$;

(f) and repeating steps (a) through (e) until either said error value is less than a predetermined error value or said steps (a) through (e) have been repeated a predetermined number of times;

(8) storing said value table for use in said subtractive color printing system.

6. A method of creating a correctd color control table for use in a subtractive color printing system as recited in claim 5 wherein:

said predetermined number of times equals twenty five.

7. A method of creating a corrected color control table for use in a subtractive color printing system as recited in claim 5 wherein:

said predetermined error value is equal to $1/255\times$Max color value wherein Max color value is a maximum value of each of said red output value, green output value, blue output value entries in said output triplets.

* * * * *